(12) United States Patent
Beecher

(10) Patent No.: US 10,878,519 B2
(45) Date of Patent: Dec. 29, 2020

(54) SYSTEM AND METHOD FOR ORDERING AND DELIVERING FOOD/DRINKS

(71) Applicant: Gordon Beecher, Colorado Springs, CO (US)

(72) Inventor: Gordon Beecher, Colorado Springs, CO (US)

(*) Notice: Subject to any disclaimer, the term of this patent is extended or adjusted under 35 U.S.C. 154(b) by 174 days.

(21) Appl. No.: 16/293,901

(22) Filed: Mar. 6, 2019

(65) Prior Publication Data
US 2020/0286193 A1     Sep. 10, 2020

(51) Int. Cl.
G06Q 30/00     (2012.01)
G06Q 50/00     (2012.01)
G06Q 10/00     (2012.01)
G06Q 50/12     (2012.01)
G06Q 30/06     (2012.01)
G06Q 20/32     (2012.01)
G09G 5/02      (2006.01)
G06F 3/0482    (2013.01)

(52) U.S. Cl.
CPC ........... G06Q 50/12 (2013.01); G06Q 20/322 (2013.01); G06Q 30/0633 (2013.01); G09G 5/026 (2013.01); G06F 3/0482 (2013.01); G09G 2320/0666 (2013.01); G09G 2354/00 (2013.01)

(58) Field of Classification Search
None
See application file for complete search history.

(56) References Cited

U.S. PATENT DOCUMENTS

| 5,377,097 A | * | 12/1994 | Fuyama | G06Q 10/087 235/383 |
|---|---|---|---|---|
| 2014/0122170 A1 | * | 5/2014 | Padgett | G06Q 10/0631 705/7.29 |
| 2015/0302347 A1 | * | 10/2015 | Fredette | G06Q 10/083 705/15 |

* cited by examiner

*Primary Examiner* — Ariel J Yu
(74) *Attorney, Agent, or Firm* — Leyendecker & Lemire, LLC

(57) ABSTRACT

A system and method for ordering and delivering food/drinks is described. Embodiments of the system and method can include an application running on a restaurant device and one or more user devices. Customers of the restaurant can order food via the application and the smart device can illuminate in a color assigned to the order via the application. The application can be implemented on the restaurant device to assign colors to orders and let workers of the restaurant know which color each order is associated with. Workers may then look for a smart device illuminated in a particular color to know where to deliver an order.

20 Claims, 15 Drawing Sheets

SYSTEM AND METHOD FOR ORDERING AND DELIVERING FOOD/DRINKS

BACKGROUND

Currently, when wanting to order food or drinks at a restaurant, patrons of the restaurant must interact with a restaurant worker. This creates problems when a patron needs something but the restaurant workers are too busy to continually check on the patron. Patrons consistently need to wait for their server to return before being able to ask for a refill or reorder drinks.

Therefore, there is a need for a system of ordering and delivering food and drinks that allows a patron to place orders themselves that are sent to a smart device being used by the restaurant workers and provides a means for indicating where said order should be delivered such that any restaurant worker may deliver the items without having previously waited on the patron.

DETAILED DESCRIPTION

Figure 1:
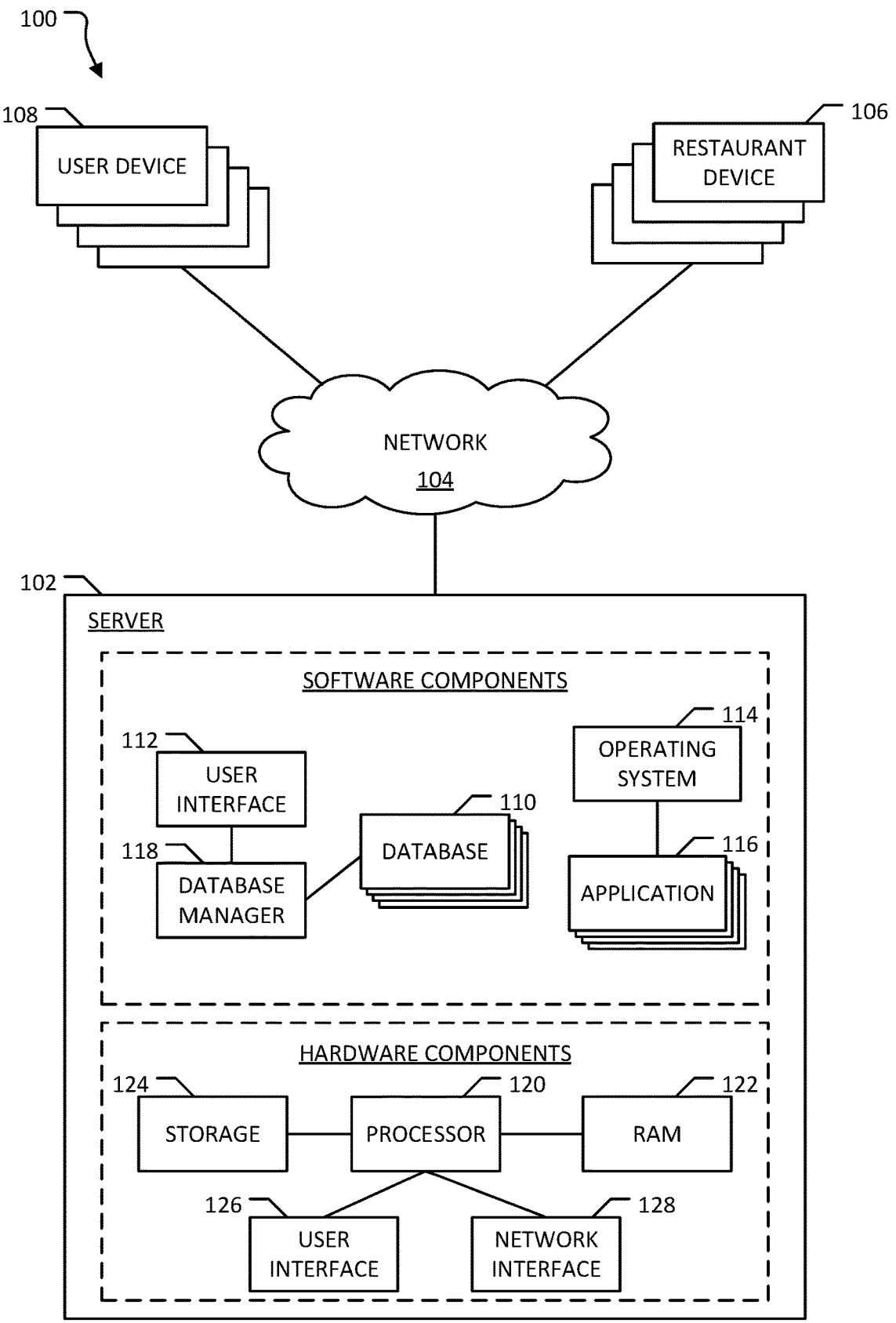
FIG. 1 is a block diagram of an ordering system according to one embodiment of the present invention.

Embodiments of the present invention include a system and method for ordering and delivering food/drinks. The system can include, but is not limited to, a server, one or more restaurant devices, one or more user devices, and a network. The system can further include an application configured for use on the one or more restaurant devices and the one or more user devices. Typically, the application on the restaurant devices can have a different interface and options from the application on the user devices. The application on the restaurant device can provide information related to orders users have placed along with options for workers of the restaurant to interact with. The application on the user device can be implemented to provide a menu of items to the user along with the ability to order items on the menu. The application on the user device can further include the feature of illuminating a screen of the user device a color assigned by the application. Of note, other features and information may be presented on the devices, as will be discussed hereinafter.

In one embodiment, the one or more restaurant devices can be any type of smart mobile device. For instance, a smartphone or a tablet may be implemented. The restaurant devices can include the application running on the restaurant devices. Typically, the application can be personalized for each restaurant the application may be set-up to work for. In some embodiments, the restaurant devices may be located at predetermined locations for restaurant workers to use. For instance, in a bar, the restaurant devices may be located on the restaurant side of the bar where a bartender may easily use the restaurant device. In another embodiment, each worker who interacts with a patron of the restaurant may use their own smart device or one provided by the restaurant.

Typically, the one or more user devices can be smart phones which are capable of running applications. A user may download the application from an appropriate app store based on their operating system and then setup a user profile in the application. The application for the user device can include a means for displaying restaurants on a map that are currently set up with the application. As can be appreciated, a user may determine where to eat based on the availability of using the described application to order food and drinks. In one embodiment, the application may be automatically started when a user device determines the device is in a predetermined location of a restaurant based on GPS or other location determining services.

In one embodiment, the system can include a financial payment setup whereby the application running on the one or more user devices can include pairing a payment method with the application. As can be appreciated, a user may pay their bill via the application when they are finished and not have to wait to flag down a restaurant worker. In one embodiment, the payment may be made when the application determines that the user has left the restaurant. For instance, GPS information can be used to determine a location of the user device and when that user device has been determined to leave a predetermined distance from the restaurant, the application can automatically initiate payment via the paired payment method. In one instance, the application may automatically query the user as to a gratuity amount to add to the total. In another instance, the application may apply a predetermined gratuity based on default rate set by the user or the application.

Embodiments of the present invention allow a customer (e.g. a user) to initiate transactions with a service industry professional (e.g., server) that make a restaurant and bar experience more convenient and efficient for both the user and the restaurant or bar establishment. Users will be able to identify establishments that offer the system by an in-app map. Similarly, establishments may inform their guests of the availability of the system in the establishment.

In one example embodiment, once a user is logged into the application at a restaurant, the user may identify themselves by selecting their table. This may be facilitated by a sticker on the table or by the server informing the guests of their table number. In some embodiments, the restaurants may provide barcodes on each table allowing a user to scan the barcode in the application such that the user is associated with a particular table. The establishment may choose to feature certain items (e.g., items currently being promoted by the restaurant or items regularly ordered by a particular user) or may upload an entire menu for customers perusal. A user may select an item off of the menu, may select an amount of that item (e.g., "1 beef taco" and "2 shrimp tacos"), and will see the resulting subtotal in the application. Once the selections have been made, the user can then send the order to his/her server via the application. To handle the user's order, the establishment may opt to have the servers receive the order directly via a restaurant device running the restaurant application. As servers often keep their phones in their pockets, having an order arrive directly to the server prevents the server from having to constantly check-up on the tables or may assist in the efficient flow of business in an otherwise congested restaurant.

In one embodiment, the restaurant application can allow the establishment to track an activity of the entire restaurant. For instance, a manager may pull up current orders and estimated totals of billing for a given time. It is to be appreciated that a variety of different analytics may be collected and presented to the restaurant from data collected by the application. For instance, the restaurant may determine which food items are popular by tracking order history and extracting information form the order history.

In one example, a method of receiving and delivering an order can include the steps of, but is not limited to, providing a menu of items available to order, receiving a first order for one or more items on the menu via a first user device determining if a color assignment is available for the first order, assigning a first color to the first order when color assignment is available, sending a first signal including the first color to the first user device, illuminating a screen of the first user device in the first color in response to receiving the first signal, locating the first user device via the illuminated screen of the first user device, and delivering the first order to a user of the first user device. The method may further include the steps of receiving a second order for one or more items on the menu via a second user device, determining if a color assignment is available for the second order, queuing the second order when a color assignment is not available, and continuously checking to see if a color assignment is available for the second order. When a color assignment becomes available for the second order, a second color can be assigned to the second order, a second signal including the second color can be sent to the second user device, a screen of the second user device can be illuminated in the second color in response to receiving the second signal, the second user device can be located via the illuminated screen of the second user device, and the second order can be delivered to a user of the second user device.

The present invention can be embodied as devices, systems, methods, and/or computer program products. Accordingly, the present invention can be embodied in hardware and/or in software (including firmware, resident software, micro-code, etc.). Furthermore, the present invention can take the form of a computer program product on a computer-usable or computer-readable storage medium having computer-usable or computer-readable program code embodied in the medium for use by or in connection with an instruction execution system. In one embodiment, the present invention can be embodied as non-transitory computer-readable media. In the context of this document, a computer-usable or computer-readable medium can include, but is not limited to, any medium that can contain, store, communicate, propagate, or transport the program for use by or in connection with the instruction execution system, apparatus, or device.

The computer-usable or computer-readable medium can be, but is not limited to, an electronic, magnetic, optical, electromagnetic, infrared, or semiconductor system, apparatus, device, or propagation medium.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment", "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiments and are not necessarily intended to be construed as limiting.

The term "software," as used in this specification and the appended claims, refers to programs, procedures, rules, instructions, and any associated documentation pertaining to the operation of a system.

The term "firmware," as used in this specification and the appended claims, refers to computer programs, procedures, rules, instructions, and any associated documentation contained permanently in a hardware device and can also be flashware.

The term "hardware," as used in this specification and the appended claims, refers to the physical, electrical, and mechanical parts of a system.

The terms "computer-usable medium" or "computer-readable medium," as used in this specification and the appended claims, refers to any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

The term "signal," as used in this specification and the appended claims, refers to a signal that has one or more of its characteristics set or changed in such a manner as to encode information in the signal. It is to be appreciated that wireless means of sending signals can be implemented including, but not limited to, Bluetooth, Wi-Fi, acoustic, RF, infrared and other wireless means.

The term "restaurant," as used in this specification and the appended claims, refers to an establishment that serves food, alcohol, or a combination of both. By way of example, and not limitation, restaurant may refer to a bar, a pub, an eatery, a grill, a grille, a brewery, etc.

A First Embodiment of an Ordering System

Referring to FIG. 1, a block diagram of an embodiment 100 showing an ordering system is illustrated. The ordering system 100 can be implemented to provide a means of notification for a user device for a server at a restaurant to determine where an order goes. For instance, a user may place an order via an application on their phone, the order can be sent to a server and be color coded by the system. The application can assign a color to the order and illuminate a device of the user in the color assigned to their order. The user may then display their order color from their smart device to allow a server to determine where they are and where their order should go.

In one embodiment, the ordering system 100 can include a server 102, a network 104, one or more restaurant devices 106, and one or more user devices 108. Typically, the restaurant devices 106 and the user devices 108 can be connected via a local area network. For instance, the restaurant may provide a local area network in their establishment.

Generally, data related to one or more restaurants and one or more users can be stored in the server 102. For instance, the data can be stored in the one or more databases 110 of the server 102. In one example, data related to restaurants can be stored in a separate database from data related to the one or more users. In some instances, the data can be stored in databases remotely located from one another. It is to be appreciated that the data may be stored externally to the server 102. For instance, the databases 110 can be remotely located from the server 102. In one embodiment, the one or more restaurant devices 106 may have access to a different database than the one or more user devices 108 have access to.

Typically, a user can input information into an application on a user device 108 that can then be transferred to and stored in one of the databases 110. A unique identifier, preferences, and relevant ordering history information can be stored for each user in the server 102. Further, information related to each restaurant offering the described system can have information stored in one of the databases 110. For instance, information related to menu items available, order history, customer history, payment history, etc. may be stored by the databases 110.

The server 102 can represent a server or another powerful, dedicated computer system that can support multiple user sessions. In some embodiments, the server 102 can be any type of computing device including, but not limited to, a personal computer, a game console, a smartphone, a tablet, a netbook computer, or other computing devices. In one embodiment, the server 102 can be a distributed system wherein server functions are distributed over several computers connected to a network. The server 102 can typically include a hardware platform and software components. In some instances, the restaurant devices 108 may be implemented as the server 102.

The software components of the server 102 can include the one or more databases 110 which can store user information and data. The software components can also include an operating system 114 on which various applications 116 can execute. A database manager 118 can be an application that runs queries against the databases 110. In one embodiment, the database manager 118 can allow interaction with the databases 110 through an HTML user interface on a user device 108.

The hardware platform of the server 102 can include, but is not limited to, a processor 120, random access memory 122, and nonvolatile storage 124. The processor 120 can be a single microprocessor, multi-core processor, or a group of processors. The random access memory 122 can store executable code as well as data that can be immediately accessible to the processor. The nonvolatile storage 124 can store executable code and data in a persistent state.

The hardware platform can include a user interface 126. The user interface 126 can include keyboards, monitors, pointing devices, and other user interface components. The hardware platform can also include a network interface 128. The network interface 128 can include, but is not limited to, hardwired and wireless interfaces through which the server 102 can communicate with other devices including, but not limited to, the restaurant devices 106 and the user devices 108.

The network 104 can be any type of network, such as a local area network, wide area network, or the Internet. In some cases, the network 104 can include wired or wireless connections and may transmit and receive information using various protocols.

The restaurant devices 106 can typically be a computing device configured to have an application stored thereon. Examples of such devices can include, but are not limited to, desktop computers, laptop computers, tablet computers, mobile telephones, game consoles, network appliances, or any other web-enabled devices. The restaurant devices 106 can be implemented to receive order information from a user device 108. The application running on the restaurant devices 106 can be implemented to assign colors to orders received from the user devices 108. In one embodiment, the application can include approximately 5 colors for assigning to various orders. After an order has been completed (e.g., delivered to a patron), the application can assign the freed-up color to the next order in a que. Of note, a restaurant may implement more colors depending on a capacity to facilitate filling orders.

The one or more user devices 108 can be any type of computing device on which a browser or application can operate. Examples of such devices can include, but are not limited to, desktop computers, laptop computers, tablet computers, mobile telephones, game consoles, network appliances, or any other web-enabled devices. As can be appreciated, portable smart devices are likely to be carried by patrons of a restaurant. In an embodiment, the user devices 108 can have various hardware platforms on which a browser can execute. The browser can be used to access the HTML user interface of the database manager 118. In one instance, the system can execute functional operations by virtue of service calls to a service-based processing system.

Typically, the one or more restaurant devices 106 and the one or more user devices 108 can each include an application that may communicate with one another via the network 104. In some instances, the devices may communicate via a wireless protocol such as Bluetooth or Near Field Communication. Typically, the application can have a user interface for the one or more user devices 108 and a restaurant interface for use with the one or more restaurant devices 106. As can be appreciated, the restaurant interface can have access to different information than the user interface. In some instances, where a user has the application stored and running on their smart device, the application may automatically present information for a particular restaurant via geographical information. Alternatively, the user may manually select a restaurant to connect to order food and/or drinks.

In some embodiments, the application on the restaurant device 106 may put a hold on an order if a user device leaves the restaurant or has not yet arrived at the restaurant. This can be implemented to stop people from placing orders that are not at the restaurant or are on their way and have not yet arrived.

Figure 2:
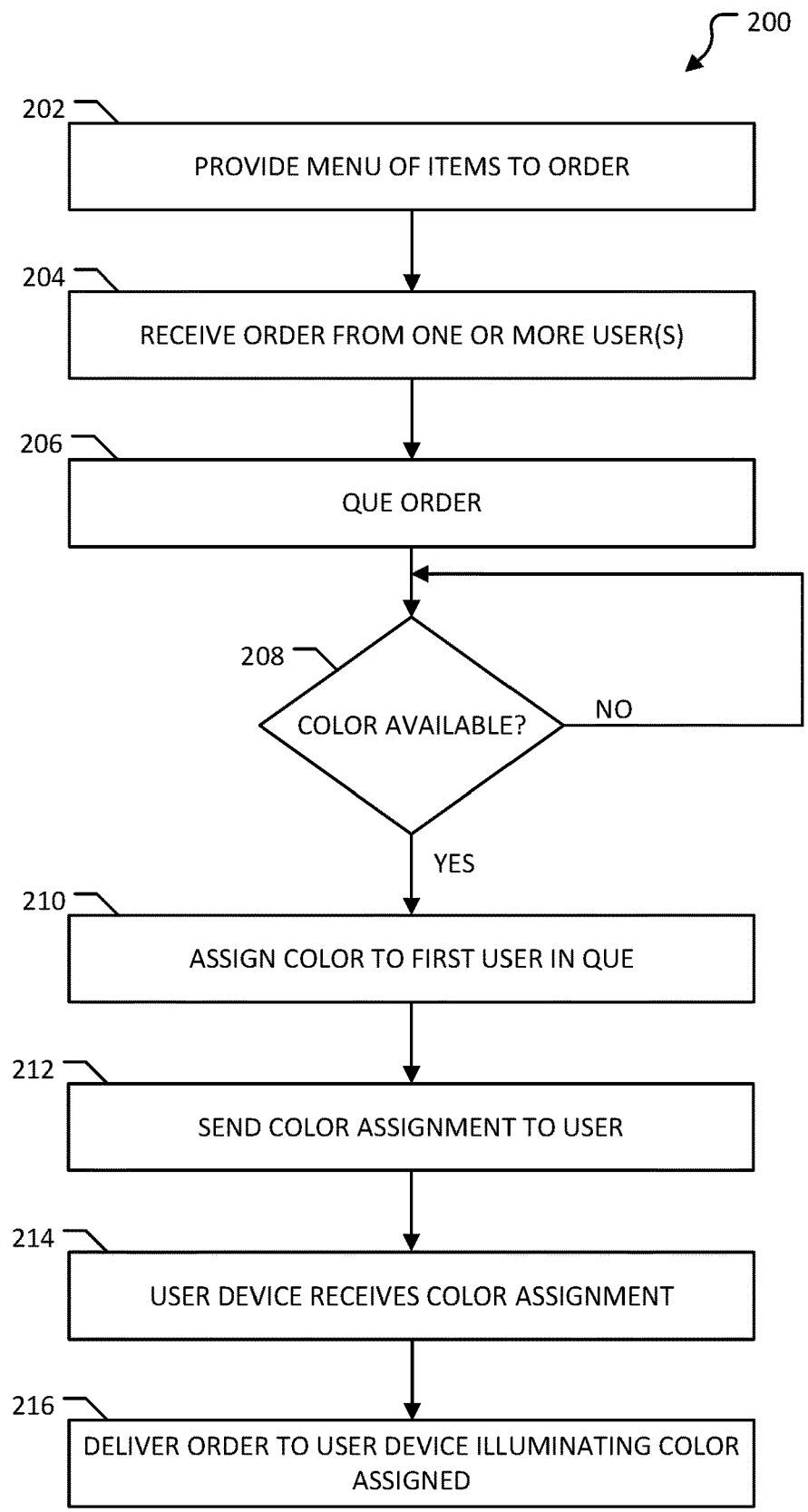
FIG. 2 is a flow chart of a method of implementing an ordering system according to one embodiment of the present invention.

Referring to FIG. 2, a method (or process) 200 of implementing the ordering system 100 is illustrated.

In block 202, a menu of items available to order at a particular restaurant can be available to a user device 108 via an application. Typically, a user can open the application on their user device 108 to access the menu of items at a particular restaurant.

In block 204, a restaurant device 106 can receive orders from one or more users via a user device 108. Depending on how many restaurant devices 106 are used at a particular restaurant, each of the restaurant devices 106 can receive each order placed via a user device 108. For instance, where the system 100 is implemented in a bar, each bartender may have their own restaurant device 106 that displays a notification when an order has been received. In some embodiments, the application on the restaurant device 106 may allow a worker at the restaurant to claim an order to then prepare said order. For example, the application may include an actionable icon on the restaurant device 106 allowing a worker to claim an order so that an order is not fulfilled multiple times by different workers. In one instance, a worker may log in to the application on a restaurant device 106 with a unique identifier. When the worker interacts with the actionable icon, the restaurant device 106 can know which worker claimed the order.

After an order has been received, the order can be queued by the application on the restaurant device 106 in block 206. In one example, the application can use five different colors to assign to orders. As can be appreciated, the application on the restaurant device 106 can assign up to five orders each a different color, with any order received after all the colors have been assigned being queued to wait for an order to be completed and a color to become available.

In decision block 208, after an order is received, the application can determine if a color is available to be assigned to the order. If no color is available, the order can be put in a que to wait for a color to become available. If a color is available, the method 200 can move to block 210. In some embodiments, the application can be configured to provide color assignments to multiple sections or groups of tables in a restaurant. For instance, a first worker may be assigned a first group of tables and a second worker can be assigned a second group of tables. The application may allow for each group of tables to have their own color assignments. As such, a table having a first order from the first group of tables and a table having a second order from the second group of tables may each be assigned the same color.

In block 210, a color can be assigned to the next order in the que via the application on the restaurant device 106. In one embodiment, the application can cycle through the five different colors as they become available. Of note, the color assigned can be associated with the order on both the restaurant device 106 and the user device 108.

In block 212, after the color is assigned to an order, the color assignment can be sent to the user device 108 associated with the order via a signal. In one instance, the color assignment can include a command for the user device 108 associated with the order to light up a screen of the device the color of the color assignment. The signal may also include a command to display a request/prompt that the user ensure that their device is situated with a screen of the device face-up so that the screen may be visible to workers of the restaurant. In some instances, the color assignment may include more information that can be sent to the user device 108. For instance, a total for the order or an estimated time for the order to be ready may be included in the signal sent to the user device 108.

In block 214, a user device may receive the color assignment. As previously mentioned, the color assignment may be a command signal that includes more information than just the color assignment. Once the user device 108 receives the color assignment, the application on the user device 108 may cause the user device 108 to illuminate a screen of the device the color of the color assignment. As can be appreciated, the user device 108 may then illuminate the color of the color assignment for a worker at the restaurant to easily identify where the order should be delivered.

In block 216, the order can be delivered to a user whom placed the order via their user device 108. As previously mentioned, a worker at the restaurant may determine where the order is to be delivered based on the color assignment as the user device on which the order was placed would be illuminated the color of the color assignment.

Figure 3A:
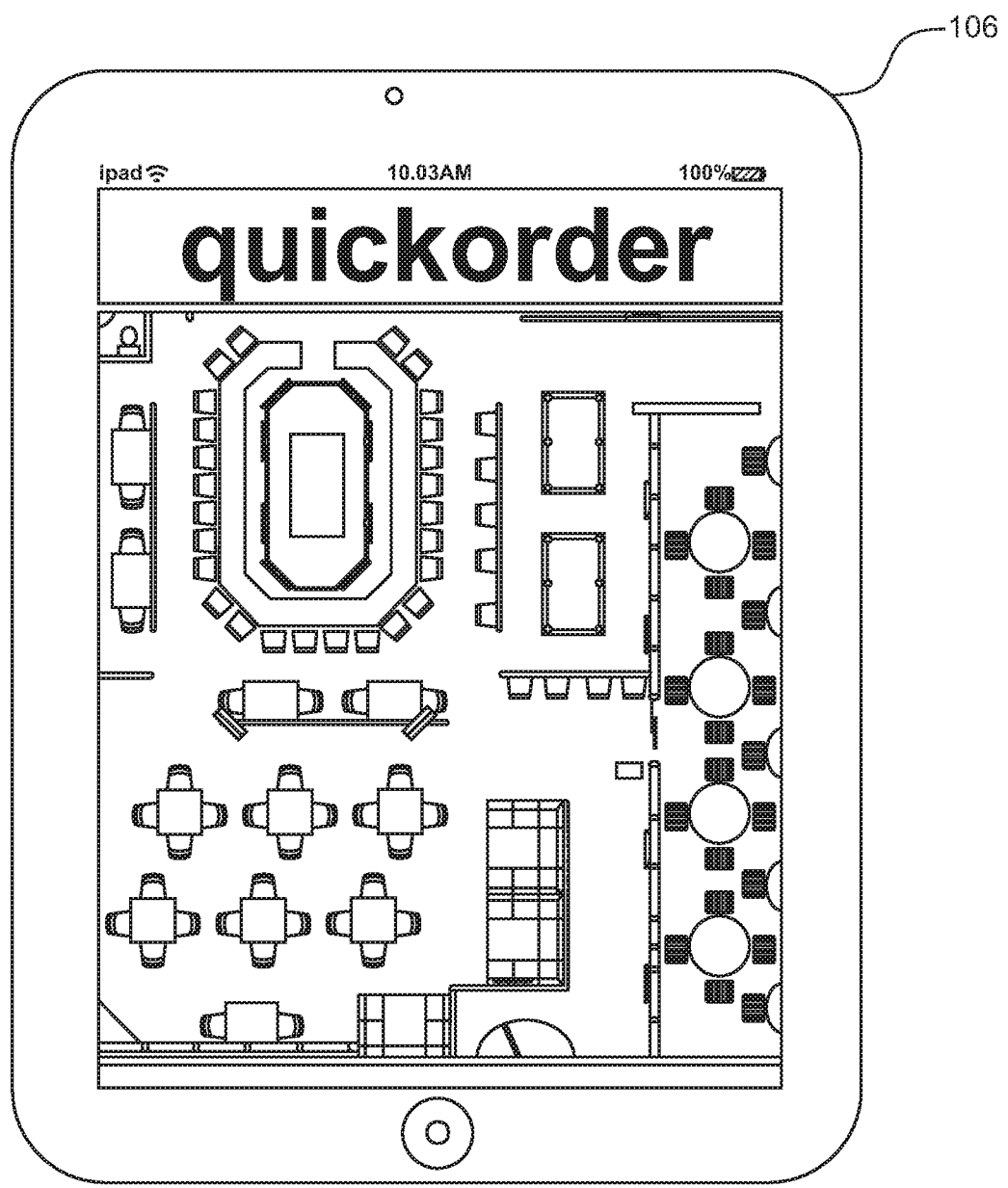
FIGS. 3A-3B are screenshots of an application on a restaurant device according to one embodiment of the present invention.
Figure 3B:
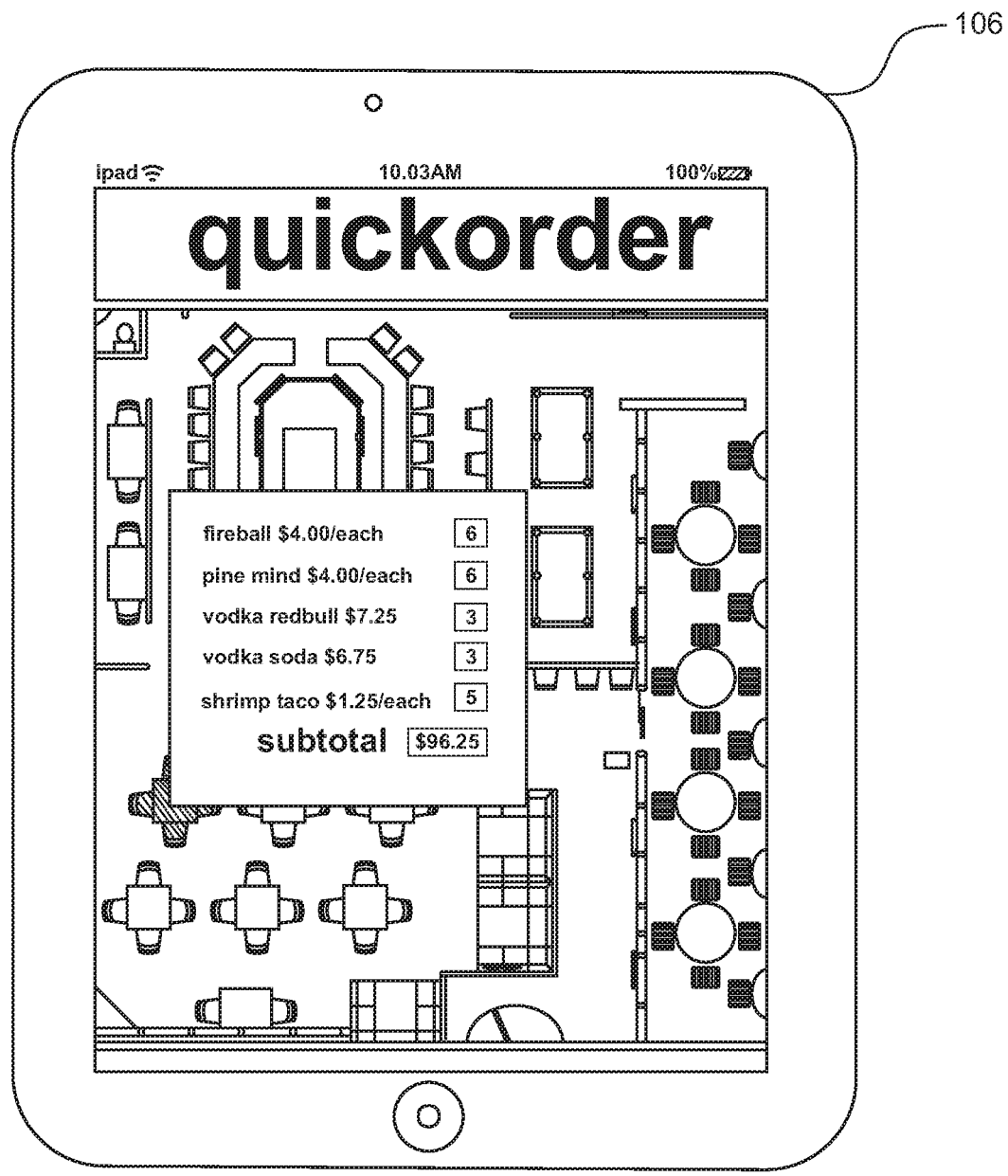

Referring to FIGS. 3A-3B, example screenshots of the application on a restaurant device 106 are shown. Of note, the screenshots are related to an overview feature available to a restaurant on a restaurant device 106.

Referring to FIG. 3A, an example screenshot of the application on a restaurant device 106 is shown. As previously mentioned, the restaurant side of the application may include an overview feature where a manager or other restaurant worker may view data about an entire restaurant in the application. For instance, the application may include a digital topographical view of the restaurant including actionable icons for table locations. In one example, a manager may select a table or group of tables (e.g. a particular server's area) and view how much revenue has been generated at that table(s).

Referring to FIG. 3B, an example screenshot of the application on a restaurant device 106 is illustrated. As shown, a table has been selected and what has been ordered at that table is graphically displayed for a manager to see. As can be appreciated, each of the illustrated tables may include an actionable item that brings up information about that table.

Referring to FIGS. 4A-4H, a plurality of screenshots of a user device 108 running the application are illustrated. The FIGS. 4A-4H can include screenshots from various steps of interacting with the application on a user device 108.

Figure 4A:
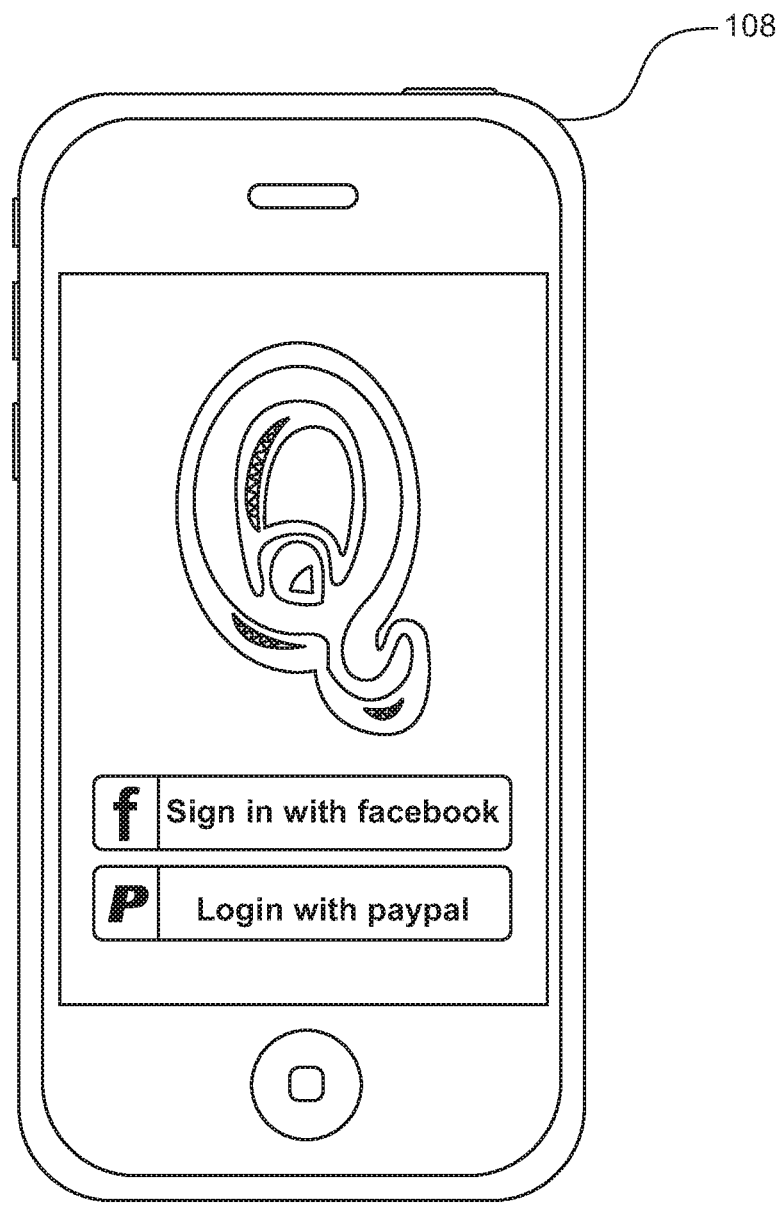
FIGS. 4A-4H are screenshots of an application on a user device according to one embodiment of the present invention.

Referring to FIG. 4A, an initial setup menu for using the application is shown. As a first step, a user can associate a unique identifier with the device and link a payment to the unique identifier. As can be appreciated, information related to the user can be stored in the databases 110. After the user has linked another profile or created a new one in the application, the user may begin to user the application.

Figure 4B:
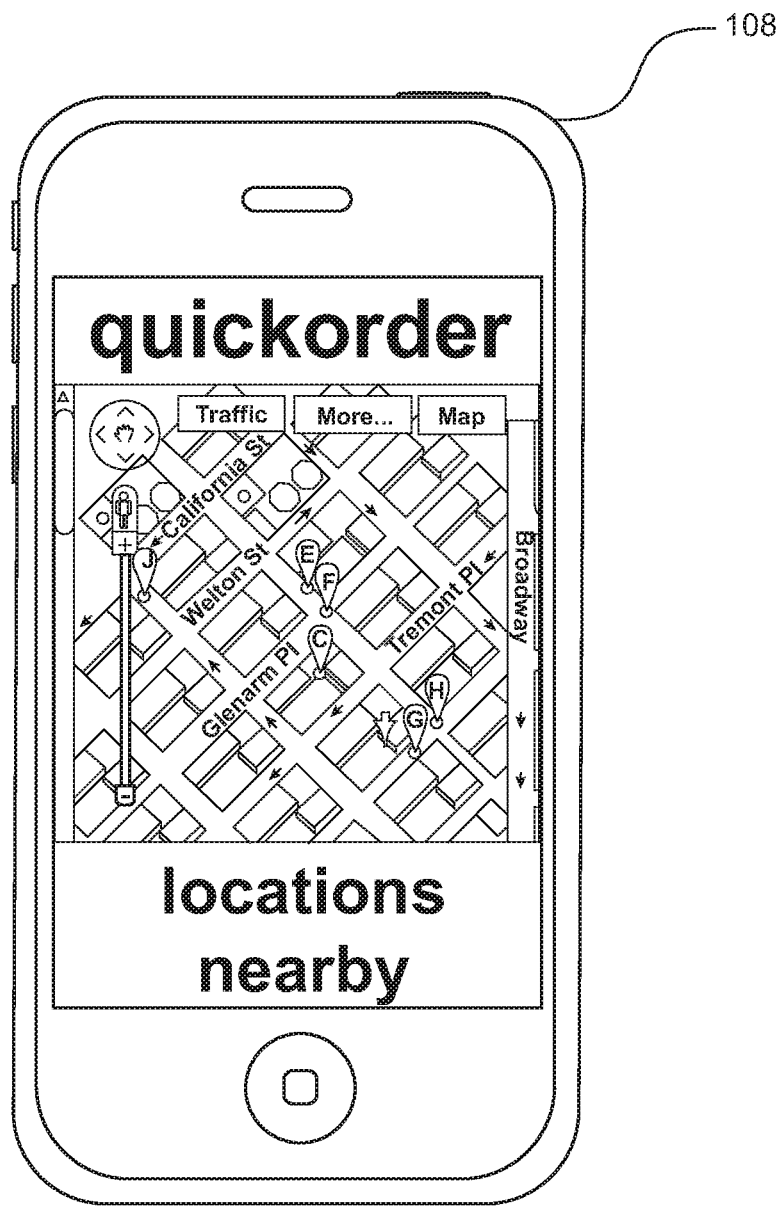

Referring to FIG. 4B, a map including graphical icons for locations which implement the described system is shown. In one instance, a user can access the map in the application and view restaurants near them where the system is available. As can be appreciated, a user may be more inclined to pick one restaurant over another by knowing that said restaurant offers the described system. In one embodiment, the application may be configured to have the map open when a user opens the application on their user device.

Figure 4C:
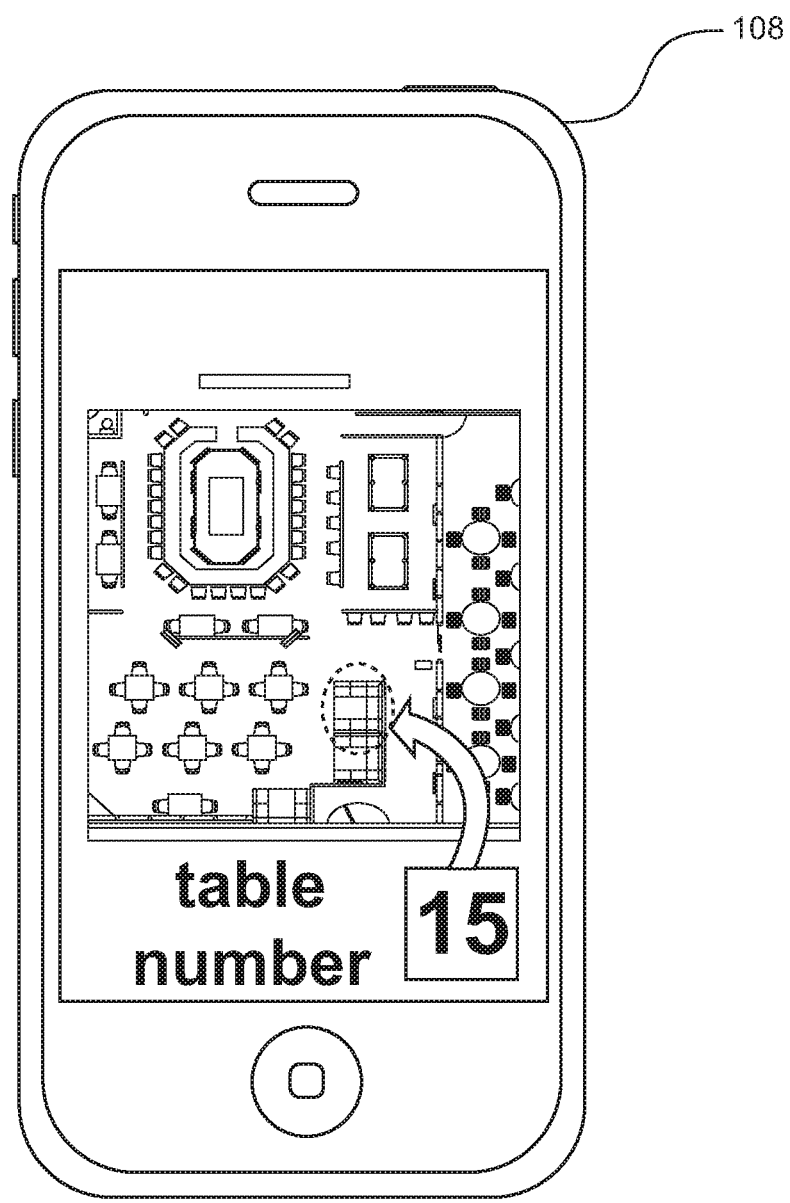

Referring to FIG. 4C, a graphical display of a restaurant floor plan along with a signifying number particular to a user is shown. In some embodiments, when a user enters a restaurant, the restaurant may assign the user a unique number or other identifier for the user to enter into the application. As can be appreciated, this may allow the restaurant to correlate orders with a specific user. Typically, the unique identifier from the restaurant may also correlate to a specific table in the restaurant. As such, workers in the restaurant may know which table to take an order based on the unique identifier.

Figure 4D:
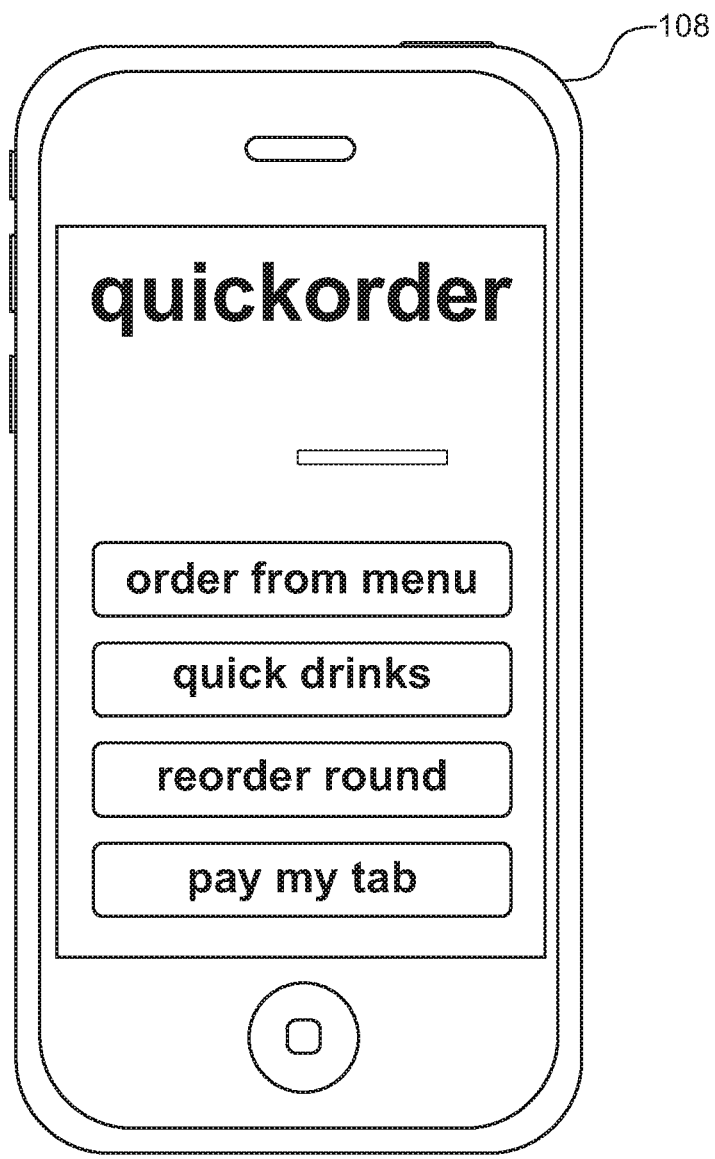

Referring to FIG. 4D, a screenshot of the application on a user device 108 is illustrated showing a plurality of options for a user to choose from. In some instances, the user may select from options including, but not limited to, ordering from the menu, quick drink order, reorder option, and a payment option. Of note, the options available to a user may be customized.

Figure 4E:
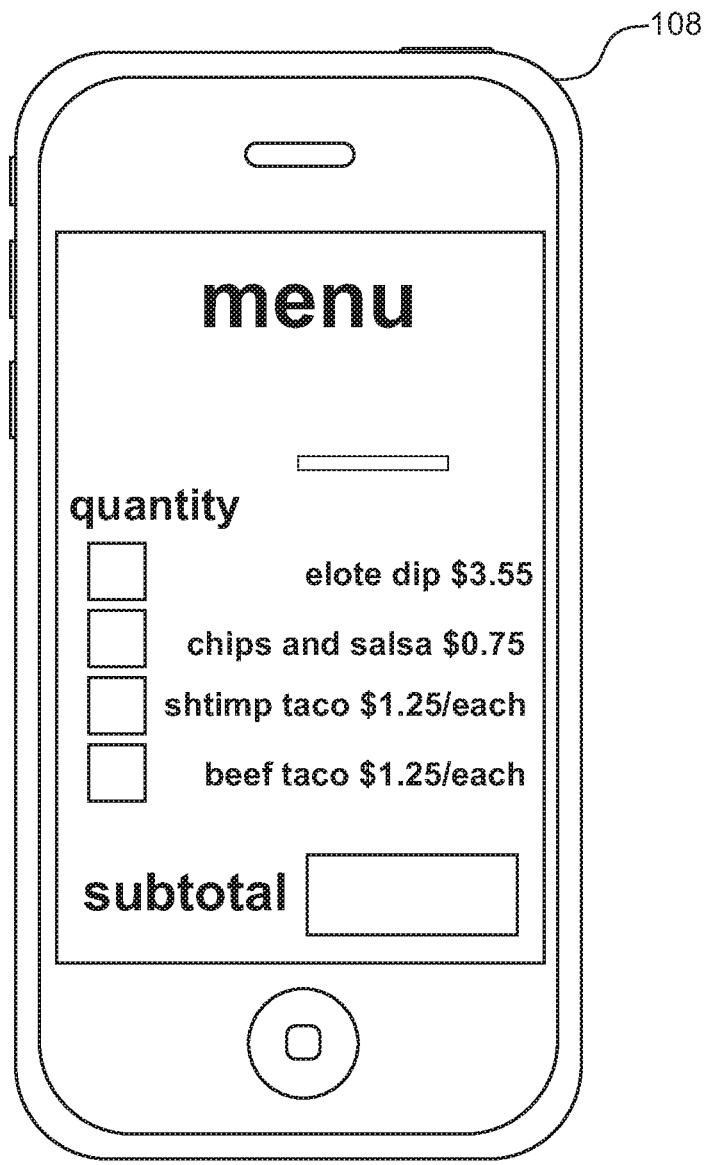

Referring to FIG. 4E, a screenshot of the option of "order from menu" showing an example menu is illustrated. As shown, the user may select an item and input how many of said item they would like. A subtotal for the order may also be shown so that a user knows approximately how much money they are potentially spending.

Figure 4F:
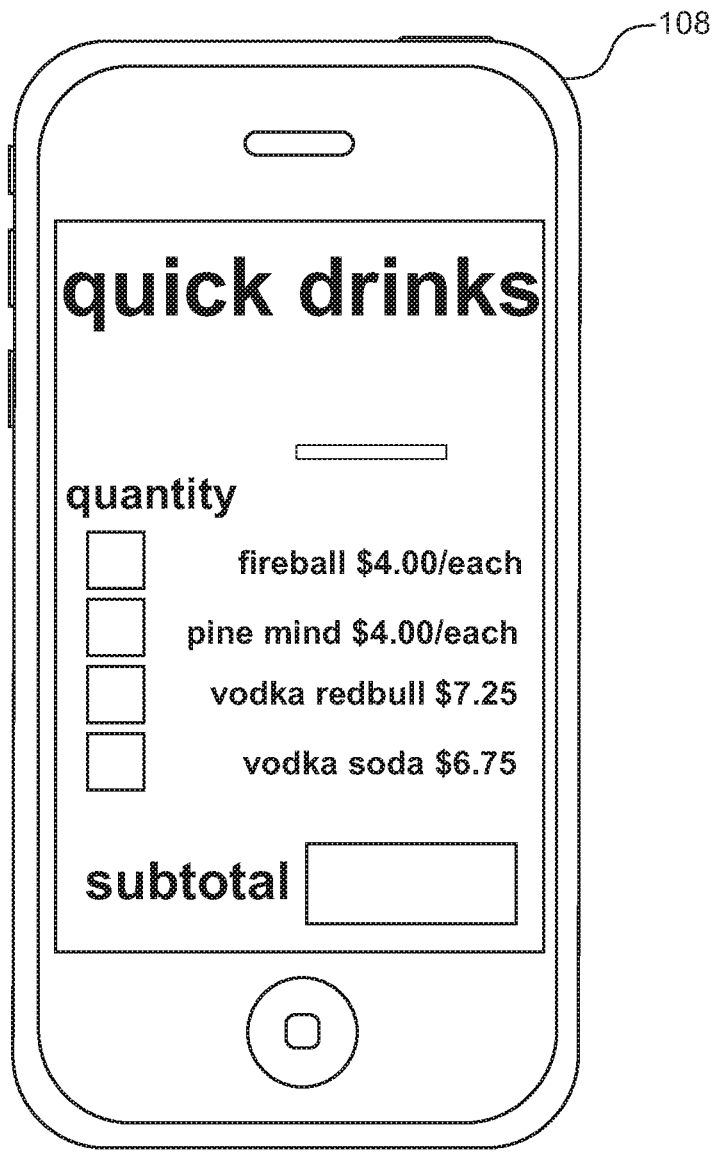

Referring to FIG. 4F, a screenshot of the option of "quick drinks" showing an example drink menu is illustrated. Similar to the "order from menu" option, the quick drinks can allow a user to select from a variety of drinks and input a quantity for said drinks. The application can show the user a subtotal for the drinks selected.

Figure 4G:
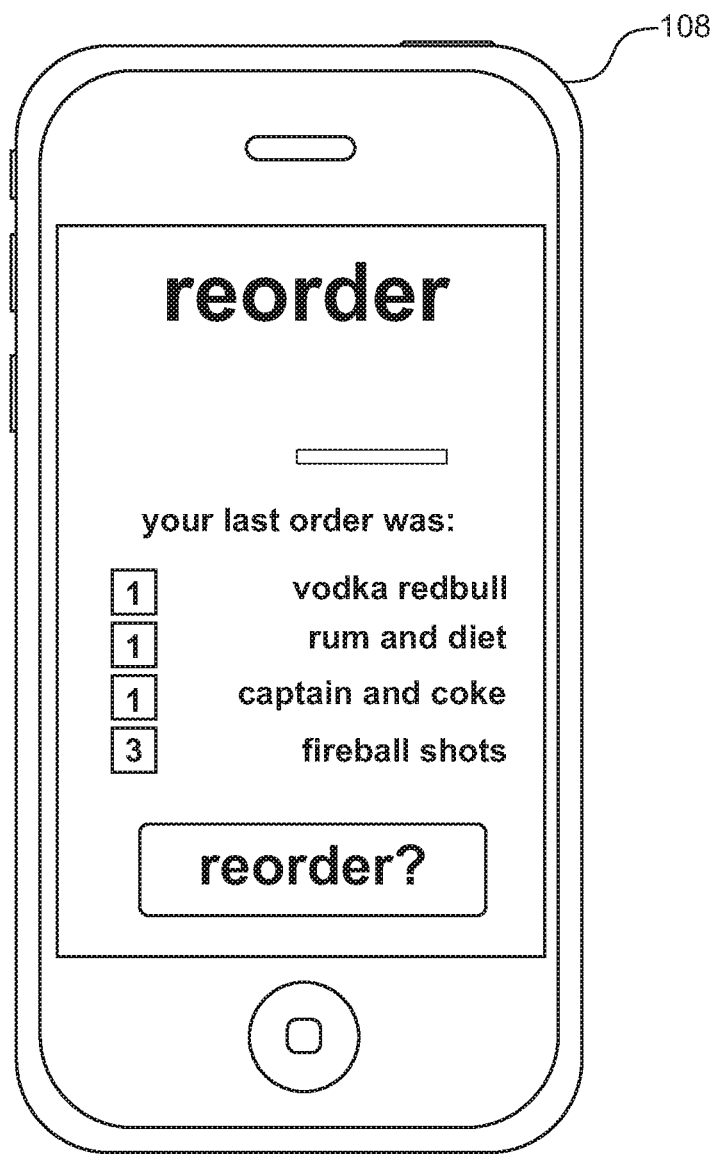

Referring to FIG. 4G, a screenshot of the option of "reorder round" from the menu is illustrated. As shown, the application can display a quantity and type for each drink from a previous order. The user may then activate the "reorder?" icon to reorder the last round.

Figure 4H:
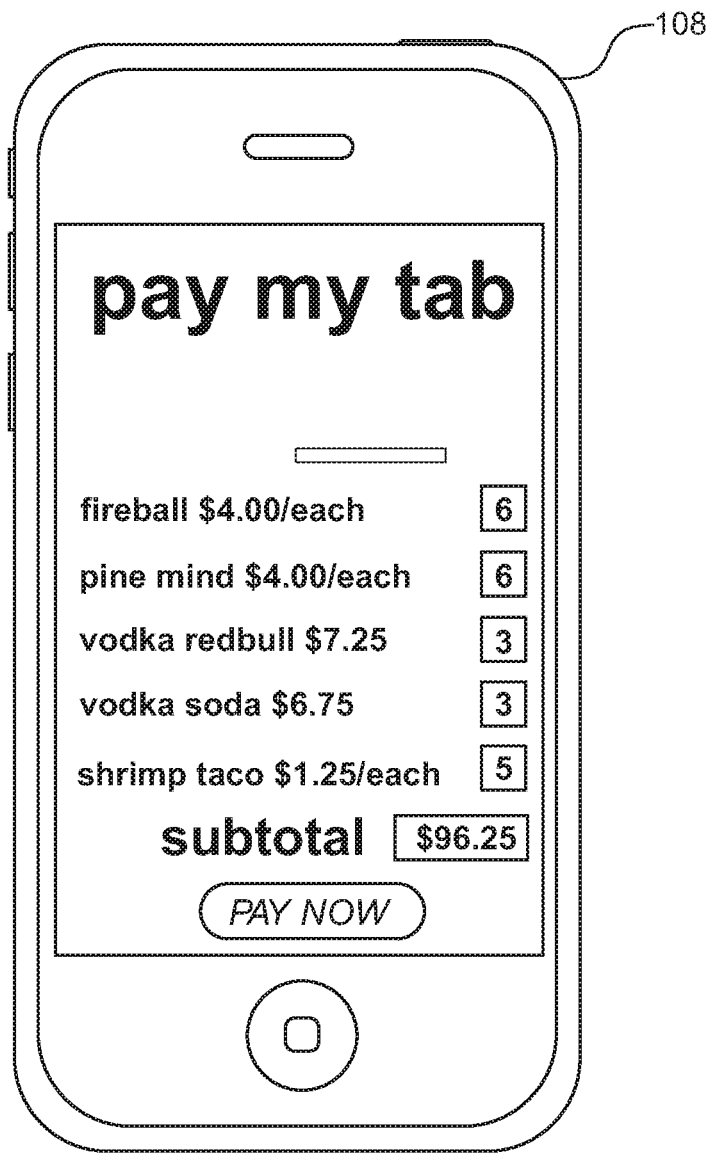

Referring to FIG. 4H, a screenshot of the option of "pay my tab" from the main menu is illustrated. As shown, the application can present the user with a listing of all items ordered and a total cost for the entire tab. As previously mentioned, the application on the user device 108 may be setup with a payment method. When a payment method has been setup, the user may simple activate the "Pay Now" icon to automatically pay their tab without having to interact with a worker from the restaurant.

Figure 5A:
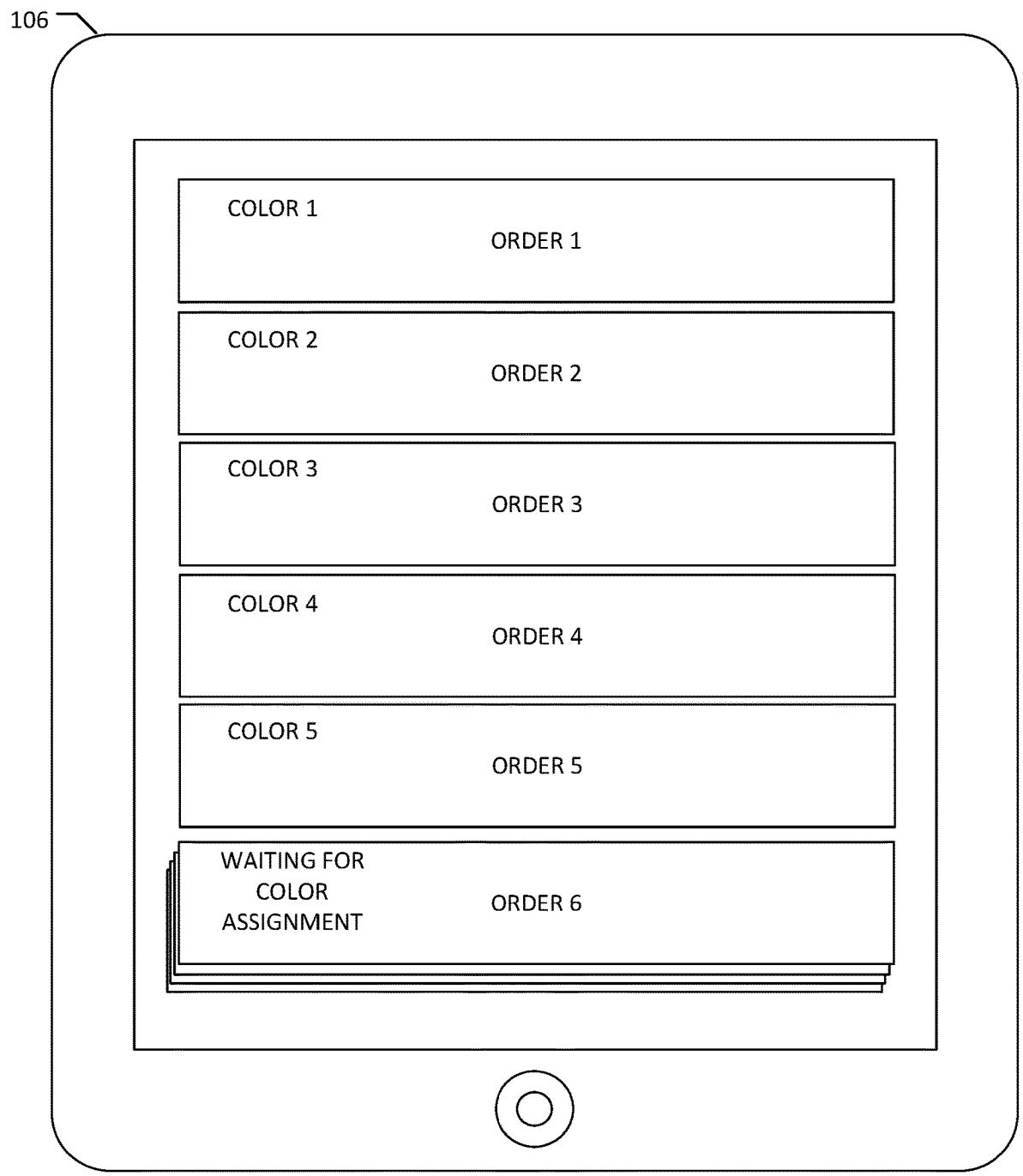
FIGS. 5A-5B are screenshots of an application on a restaurant device according to one embodiment of the present invention.
Figure 5B:
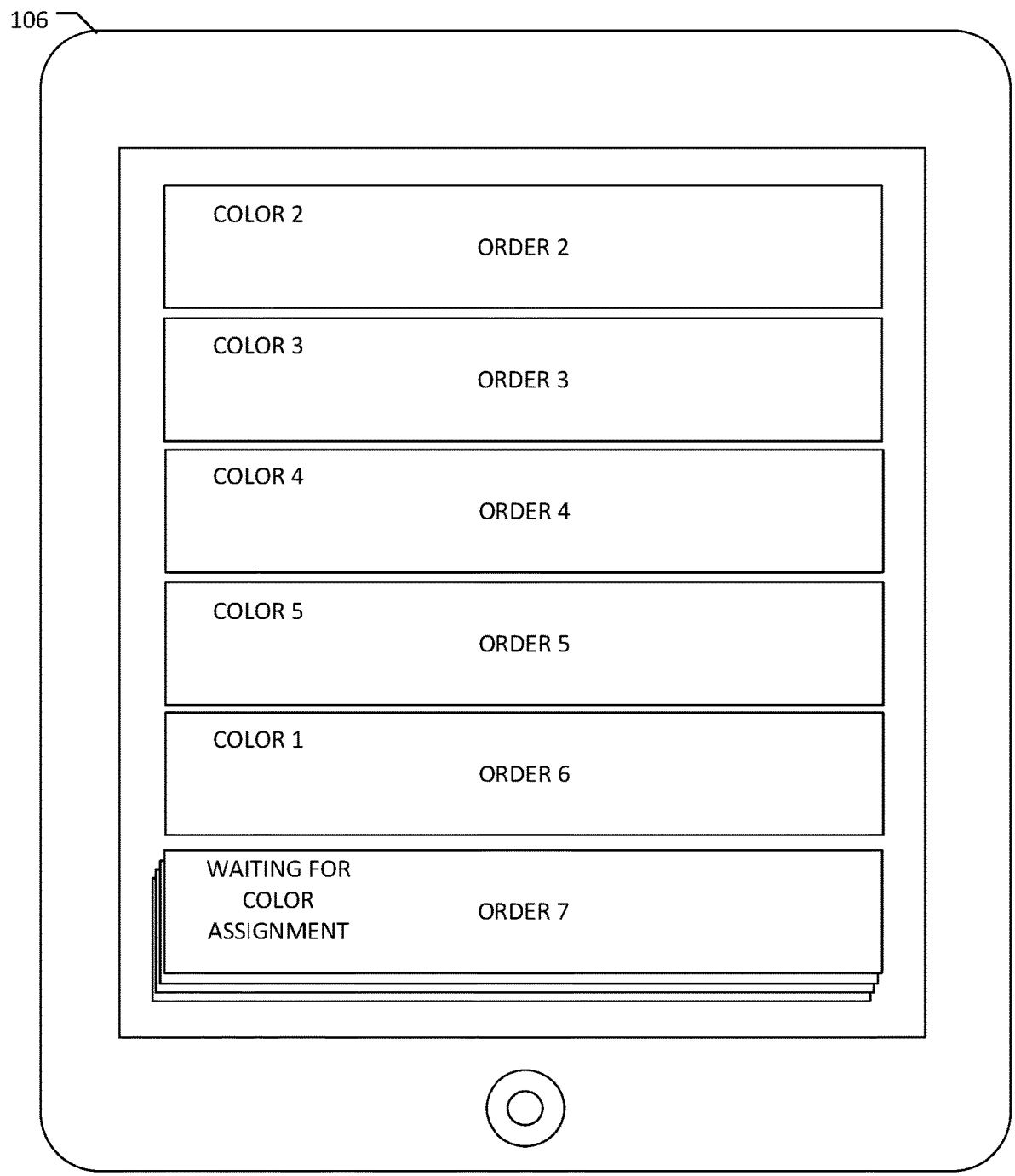

Referring to FIGS. 5A-5B, example screen shots of the application on a restaurant device 106 are illustrated. Typically, the application can provide an interface showing various orders and colors assigned to those orders. Orders which have not been assigned a color, can be placed in a que for color assignment when a color becomes available. Of note, the orders can be queued according to when they are placed.

Referring to FIG. 5A, an example screenshot of the application on a restaurant device 106 is shown. There are 5 orders each assigned a different color and an order number "6" waiting to get a color assignment. When a server using the restaurant device 106 looks at the screen, they can easily determine which orders are assigned to what color. In some embodiments, an order may become "locked" when a server selects the order to prepare. For instance, a bartender working in a bar may select order number "4" to prepare and they may enter an alphanumeric code specific to them to lock the order. As can be appreciated, by locking orders, the application can ensure that no more than 1 server prepares an order. In one instance, a visual identifier may be displayed indicating that an order has been locked.

Although not shown, each of the boxes for orders "1"-"5" can be colored the color they are assigned. As can be appreciated, a server looking at the screen can instantly know which color an order is assigned to allowing for faster service from the restaurant. Further, in lieu of remembering a table number or some other geographical marker in a restaurant, they server need only look for a user device 108 illuminated the color assigned to the order.

Referring to FIG. 5B, an example screenshot of the application on a restaurant device 106 is shown. After an order has been fulfilled, for instance order "1" from FIG. 5A, the application may assign the next order (e.g., order "6") the color assignment freed once the previous order (e.g., order "1") has been fulfilled. As shown in FIG. 5B, the order "6" can be assigned the first color and order "7" can move to first place in the que line waiting for a color assignment.

Figure 6:
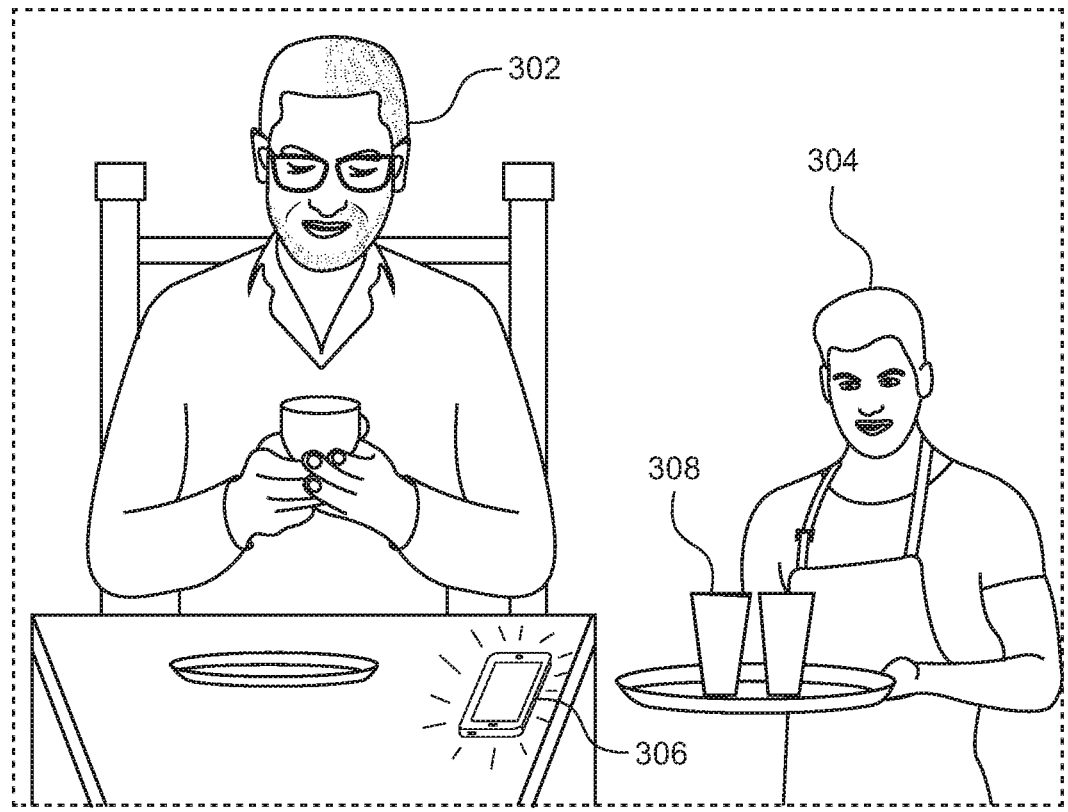
FIG. 6 is a graphical representation of an implementation of an ordering system according to one embodiment of the present invention.

Referring to FIG. 6, a diagram of a customer 302 at a restaurant using the aforementioned application is illustrated. As shown, the customer 302 has placed their smart device 306 on a table they are sitting at. A restaurant worker 304 with a couple items 308 is on the way to deliver the items. As can be appreciated, the worker 304 can look for a device illuminating in a color that was assigned to the order. For example, orange may have been assigned to the customer's 302 order. The smart device 306 may be illuminating a screen of the device in the color orange such that the worker 304 may easily determine where to deliver the items 308.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A method of receiving and delivering an order, the method comprising:
   providing a menu of items available to order;
   receiving a first order for one or more items on the menu via a first user device;
   determining if a color assignment is available for the first order;
   assigning a first color to the first order when a color assignment is available;
   sending a first signal including the first color to the first user device;

illuminating a screen of the first user device in the first color in response to receiving the first signal;

locating the first user device via the illuminated screen of the first user device; and delivering the first order to a user of the first user device.

2. The method of claim 1, further comprising the steps of:

receiving a second order for one or more items on the menu via a second user device;

determining if a color assignment is available for the second order;

queuing the second order when a color assignment is not available; and continuously checking to see if a color assignment is available for the second order.

3. The method of claim 2, wherein when a color assignment becomes available for the second order, comprising the steps of:

assigning a second color to the second order;

sending a second signal including the second color to the second user device;

illuminating a screen of the second user device in the second color in response to receiving the second signal;

locating the second user device via the illuminated screen of the second user device; and delivering the second order to a user of the second user device.

4. The method of claim 1, wherein there are at least three different colors available to assign.

5. The method of claim 1, wherein the signal sent to the first user device includes an order total.

6. The method of claim 5, the method further including the step of:

initiating a payment process to pay for the items ordered.

7. The method of claim 6, wherein the payment process is automatically completed when the first user device is a predetermined distance from a predetermined location.

8. The method of claim 7, wherein the predetermined location is a restaurant providing the items for order on the menu.

9. The method of claim 6, wherein the payment process is completed by an interaction between the user and the first user device.

10. A method of receiving and delivering an order in a restaurant, the method comprising:

by a user device, displaying a menu of items available to order;

by the user device, placing a first order of one or more items from the menu, the first order being sent to a restaurant device;

by the restaurant device, receiving the first order of one or more items from the user device;

by the restaurant device, determining if a color assignment is available for the first order;

by the restaurant device, assigning a first color to the first order when a color assignment is available;

by the restaurant device, sending a signal including the first color to the user device;

by the user device, illuminating a screen of the user device in the first color;

locating the user device via the illuminated screen in the first color of the user device; and delivering the first order to a user of the user device.

11. The method of claim 10, the method further comprising the step of:

by the user device, initiating a payment process to pay for the items ordered.

12. The method of claim 10, wherein each order displayed on the restaurant device is displayed with a background of the color assigned to a particular order.

13. The method of claim 10, wherein after an order is completed, the color assigned to the completed order is assigned to another order.

14. The method of claim 10, the method further comprising the steps of:

by the restaurant device, receiving an input that the first order has been completed;

by the restaurant device, sending a completed signal to the user device;

by the user device, stopping illuminating the screen of the user device in the first color.

15. The method of claim 10, further comprising the step of:

by the user device, confirming the first order has been delivered with each ordered item.

16. A method of implementing an ordering system, the method comprising:

providing the ordering system, the ordering system including an application adapted to run on at least one restaurant device and on one or more user devices;

providing a menu of items available to order;

receiving a first order for one or more items from the menu, the order being sent to a restaurant device;

determining if a color assignment is available for the first order;

assigning a first color to the first order when a color assignment is available;

sending a signal including the first color to a user device on which the first order was made;

causing a screen of the user device to illuminate in the first color;

locating the user device via the illuminated screen in the first color; and delivering the first order to a user of the user device.

17. The method of claim 16, wherein the system includes one or more databases, the one or more databases storing data related to a plurality of different restaurants.

18. The method of claim 17, wherein the data stored in the one or more databases are accessible by a plurality of user devices.

19. The method of claim 16, the method further comprising the steps of:

receiving a second order for one or more items from the menu, the order being sent to the restaurant device;

assigning a second color to the second order;

sending a second signal including the second color to a second user device on which the second order was made;

causing a screen of the second user device to illuminate in the second color;

receiving a third order for one or more items from the menu, the order being sent to the restaurant device;

assigning a third color to the third order;

sending a third signal including the third color to a third user device on which the third order was made; and causing a screen of the third user device to illuminate in the third color.

20. The method of claim 16, wherein orders received after all colors are assigned are queued until a current order is completed.

* * * * *